United States Patent [19]

Rainville et al.

[11] 4,227,871
[45] Oct. 14, 1980

[54] LOCATION OF EQUIPMENT ON BLOW MOLDING MACHINES

[75] Inventors: Dewey Rainville, Westfield; Ernst D. Wunderlich, Teaneck, both of N.J.

[73] Assignee: Rainville Company, Inc., Middlesex, N.J.

[21] Appl. No.: 953,073

[22] Filed: Oct. 20, 1978

[51] Int. Cl.³ .............................................. B29C 17/07
[52] U.S. Cl. .................................... 425/533; 425/183; 425/541
[58] Field of Search ............... 425/533, 541, 589, 592, 425/593, 183, 182; 264/538

[56] References Cited

U.S. PATENT DOCUMENTS

| | | | |
|---|---|---|---|
| 3,642,410 | 2/1972 | Bourgeois | 425/541 |
| 3,778,210 | 12/1973 | Heath, Jr. et al. | 425/533 X |
| 3,884,609 | 5/1975 | Britten | 425/533 X |

Primary Examiner—Jan H. Silbaugh
Attorney, Agent, or Firm—Roy C. Hopgood; John M. Calimafde; Charles W. Neill

[57] ABSTRACT

This improvement in injection blow molding machines provide simple and effective apparatus for adjusting the location of the clamping apparatus that holds a mold closed with the holding force applied at or close to alignment with the center of pressure of the air that is introduced into the mold cavity. The invention is primarily for use with the blowing mold where the center of pressure varies widely from one mold to another, depending upon the size and shape of the cavities in which the parison on a core rod is expanded to fill the mold cavity.

7 Claims, 5 Drawing Figures

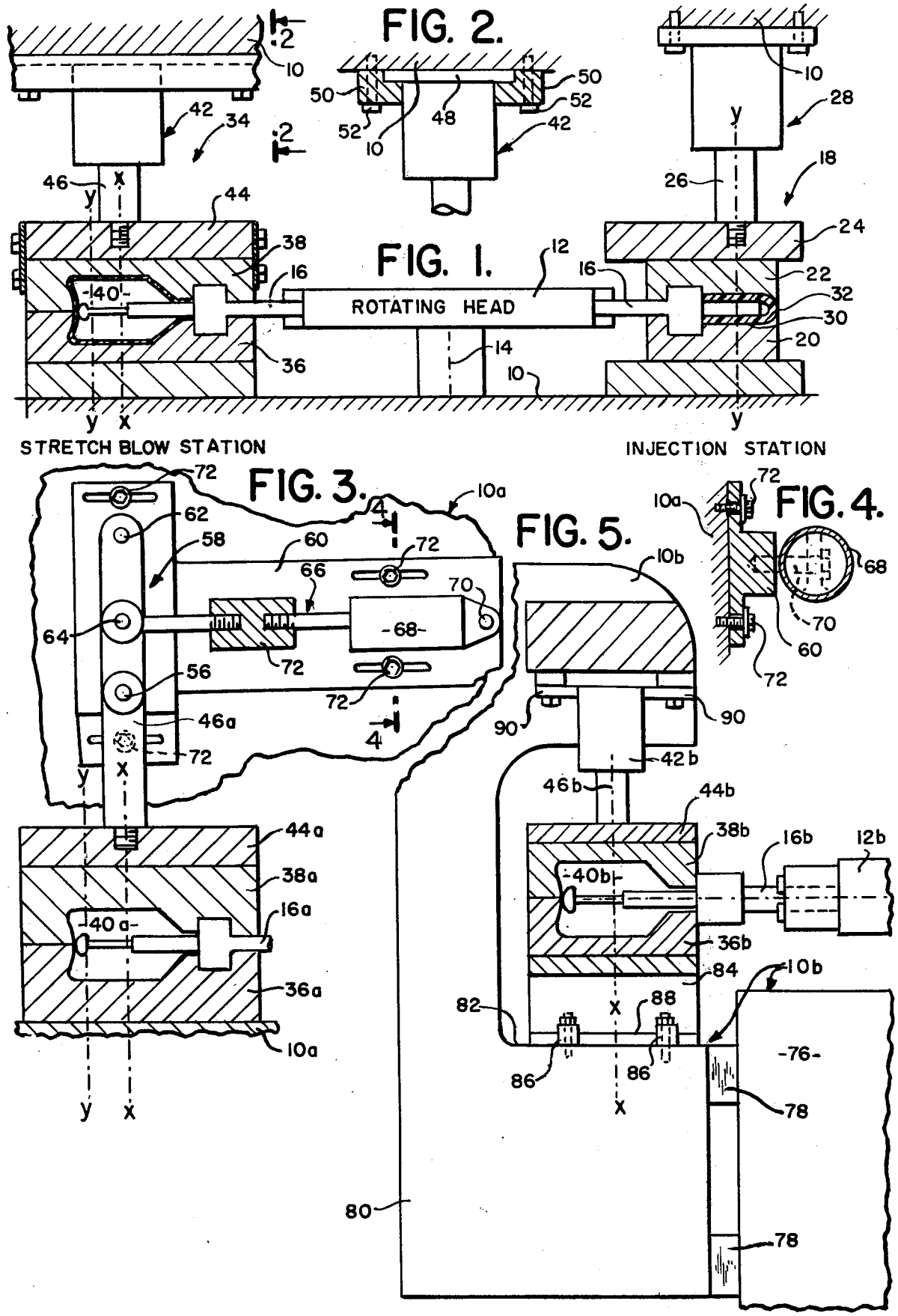

LOCATION OF EQUIPMENT ON BLOW MOLDING MACHINES

BACKGROUND AND SUMMARY OF THE INVENTION

While this invention can be used on injection molds and pre-blow molds, it is intended primarily for use with the mold into which air is injected through a core rod to expand the plastic parison on the core rod to the shape of the mold cavity into which the core rod extends. The plastic is stretched both lengthwise of the core rods and circumferentially about the axis of the core rods, and if this stretching occurs within the proper temperature range, the plastic is bi-axially oriented with resulting increase in the strength of the final product made from the plastic.

The fact that the parison is stretched in the blow mold and the amount of stretch for different length bottles may vary and also that the amount of stretch may vary with material makes it desirable to vary the position of the center of pressure.

Blow molds are generally made with a fixed portion and a movable portion that reciprocates toward and from the fixed portion for each blowing operation. The blow cavity is generally formed partly in the fixed portion and partly in the movable portion of the mold, and the molds fit together so that there is little or no indication on the molded product at the location where the mold portions came together. Motor-operated means shift the movable mold portion toward and from the fixed mold portion; and it is essential that the two portions of the mold fit together accurately.

For a number of reasons, it is advantageous to have the force that holds the mold closed applied in line with the center of pressure of the air or other fluid in the mold cavity. If a blow molding machine could be designed for making only a single product, always of the same size, there would be no problem. However, blow molding machines are expensive apparatus and customers do not want machines that are limited to the making of only a single article.

This invention provides a simple and effective construction by which a blow molding machine can be used with molds of different sizes and with mold cavities of different sizes and still maintain the force holding the mold closed in line with the center of pressure of the fluid which is injected into the cavity. The invention will be described as applied to a mold having a single cavity; but no matter how many cavities the mold has, there is always a center of pressure of the fluid which is injected into the mold.

Other objects, features and advantages of the invention will appear or be pointed out as the description proceeds.

BRIEF DESCRIPTION OF DRAWING

In the drawing, forming a part hereof, in which like reference characters indicate corresponding parts in all the views:

FIG. 1 is a diagrammatic view, mostly in section, showing a blow molding machine with an injection mold cavity and a blow mold cavity with the indexing head and core rods located in the space between the injection station and blowing station;

FIG. 2 is a sectional view taken on the line 2—2 of FIG. 1;

FIG. 3 is a diagrammatic view of a modified form of the invention showing a blowing mold and motor-operated means for opening and closing the mold and for adjusting the thrust of the motor-operated means in accordance with the center of pressure of the cavity in the mold;

FIG. 4 is a sectional view taken on the line 4—4 of FIG. 3; and

FIG. 5 is another modified construction of the invention.

DESCRIPTION OF PREFERRED EMBODIMENT

FIG. 1 is a diagrammatic showing of an injection blow molding machine having a stationary main frame 10, portions of which are shown at the upper and lower parts of the figure, it being understood that this frame is usually of integral construction. In accordance with the usual type of blow molding machine, there is an indexing or rotating head 12 which rotates about an axis 14 with intermittent angular movement to shift core rods 16 angularly from one operational station to the next. The core rods 16 extend from different faces around the perimeter of the head 12, and they move up and down with the head 12 to lift the core rods clear of the mold cavities when the molds are open to permit movement of the core rods to the next operational station.

FIG. 1 shows an injection station 18 with a mold made in two parts, including a fixed lower part 20 and a movable upper part 22.

The lower mold part 20 is secured to the frame 10, and the upper mold part 22 is connected with a movable support 24 at the lower end of a piston rod 26 which is a part of a cylinder and piston motor 28 that opens and closes the injection mold.

A mold cavity 30 receives the end portion of the core rod 16 and a plastic parison is injected into the cavity 20 and fills the space in the cavity around the core rod, as indicated by the plastic 32.

In conventional machines, the movable mold part 22 or the support 24 have guide means, and there is apparatus for injecting the plastic into the mold cavity 30, but such apparatus is well known and no illustration or description of it is necessary for a complete understanding of this invention. As illustrated, the injection mold station 18, and mold parts 20 & 22, may be considered as a conventional machine, but it is illustrated in order to bring out the fact that the novel construction of a blow mold station 34 can also be used at the injection mold station 18.

At the blow mold station 34, there is a fixed mold part 36, and a movable mold part 38 which is moved toward and from the fixed part 36 to close and open the mold cavity 40 by a cylinder and piston motor 42. This cylinder and piston motor is representative of motor-operated means for opening and closing the mold.

A support 44 is attached to the upper mold part 38 as an integral part of the movable mold section and the motor 42 has a piston rod 46 which is secured to the support 44.

In the construction illustrated, the center of pressure in the cavity 40 is on the line X—X.

If the mold parts 36 and 38 were replaced by other mold parts having a longer cavity, the center of pressure might be shifted as far to the left as the line Y—Y. The support for this longer mold would have a unit similar to the support 44, but with the socket for the piston rod 46 in alignment with the line Y—Y. The piston rod 46 would be screwed into this new connection for the new support, and the axis of the motor 42 would be shifted to the left to align with the line Y—Y.

Such an adjustment is made possible with the construction shown in FIG. 2 of flange 48 at the upper end of the motor 42 held between guides 50 and the main frame 10 of the blow molding apparatus. The guides 50 are clamped tightly against the flange 48 by bolts 52. Whenever the motor 42 is to be adjusted to a different position to accommodate a new mold, the bolts 52 are loosened enough to permit the flange 48 to slide along the guides 50 into the new position in alignment with the center of pressure of the new mold cavity. The bolts 52 are then tightened and the motor 42 becomes again an integral part of the blow molding machine.

It will be understood that when a cavity of a new size is to be used, it is necessary to replace the mold shown in FIG. 1 with another mold having the different size cavity. If the operating mechanism for opening and closing the mold is in a fixed position on the frame 10, then every mold has to be designed so as to fit the apparatus of the machine that opens and closes the mold. With the present invention, the the mold designer has much greater choice of design because the motor-operated apparatus that opens and closes the mold can be adjusted to accommodate itself to centers of pressure at different distances from the axis of rotation of the rotating indexing head 12.

FIG. 3 shows another way in which a blow molding machine can be constructed in order to accommodate different molds having their center of pressure along different lines with respect to the frame of the blow molding machine. In FIG. 3, parts corresponding to those of FIG. 1 are indicated by the same reference character with a letter "a" appended. In place of the piston rod 46, there is a rod 46a which is connected by a pivot 56 at the lower end of a toggle 58. The upper end of the toggle is connected to an adjustable plate 60 by a pivot connection 62. A middle pivot 64 of the toggle is at the end of a piston rod 66 which is part of a motor 68 with a pivot connection 70 connecting the head end of the motor 68 to the adjustment plate 60. The piston rod 66 is made in two parts connected together by a turnbuckle connector 72 which is used to adjust the stroke of the toggle to coincide with the stroke of the piston of the motor 68. The turnbuckle 72 can be adjusted to bring the toggle to dead center at the end of the motor stroke or just beyond said center.

The center of pressure of the mold cavity 40a is on the line X—X in FIG. 3. If a new mold is placed on the machine and the center of pressure of the new mold cavity is on the line Y—Y, then the toggle 58 must move into position along the line Y—Y, and this is done by releasing clamps 72, which hold the adjustment plate 60 in contact with a portion 10a of the main frame of the blow molding machine. Guides, such as the guides 50 of FIG. 2, can be used with the adjustment plate 60, and the construction shown is representative of releasable means for holding the plate 60 in various adjusted positions to line up the toggle 58 with the line Y—Y or any other line which passes through the center of pressure of a new mold which is mounted on the machine.

FIG. 5 shows another modification of the invention in which the blow molding machine is a modular machine with the separate operational stations connected with a main frame 76 by detachable fastening means which include spacers 78. Each modular station includes an integral frame 80 which connects with the main frame 76 at the spacers 78. Any conventional connecting means can be used, such as bolts extending through the spacers 78 and through the contiguous portions of the frames 76 and 80. Such constructions are used when a three-station machine must be capable of converting to a four-station machine or to a machine having even more than four stations for special work.

The frame 80 has a table 82, and mold parts are indicated by the same reference characters as in FIG. 1 but with a "b" appended.

The lower mold section 32b is connected with an intermediate structure 84 which is clamped to the table 82 by clamps 86 that bear against a flange 88 and that permit the flange 88 to slide along the table 82 to change the spacing of the mold from the main frame 76.

The cylinder and piston motor 42b is attached to the frame 80 by bolts 90 which hold the cylinder and piston motor at a fixed location with respect to the frame 80.

The center of pressure of the cavity 40b is on the line X—X. The axis of the piston rod 46b is fixed; and whenever a new mold is placed on the table 82, it is adjusted to bring its center of pressure in line with the axis of the motor 42b. This may locate the cavity or cavities in the wrong position for receiving the core rod 16b which extends from the indexing head 12b. This problem is solved by shifting the frame 80 toward or from the main frame 76 with wider or narrower spacing blocks 78 between the frames. This modification shown in FIG. 5 can only be used with modular machines where the frame for each operational station can be adjusted as to its spacing with the center main frame which carries the indexing head 12b.

It will be understood that the various constructions for adjusting the mold at the blow station to accommodate changes in the center of pressure in different molds which may be used from time to time can also be used at any other operational station such as the injection station 18 described in FIG. 1.

The preferred embodiments of the invention have been illustrated and described, but changes and modifications can be made, and some features can be used in different combinations without departing from the invention as defined in the claims.

What is claimed is:

1. In an injection blow molding apparatus including an indexing head from which core rods extend into molds at angularly related stations around an axis about which the indexing head turns to move the core rods successively from one operational station to another, characterized by one of the stations including a mold support, a mold in said support with upper and lower parts that have relative movement toward and from one another in a direction parallel to said axis to open and close a cavity within the mold, the mold being replaceable with another similar mold that encloses a cavity of a different size from that of the first mold, means for supporting the molds with the center of said similar mold cavity at a different distance from said axis of the indexing head, a motor supported in position for applying pressure to either of the mold parts to hold one mold part closed against the other mold part, an upper frame above the mold parts and by which the motor is supported and with respect to which the motor is moveable in directions for changing the position of the motor toward and from the axis of rotation of the indexing head to a location at which said motor applies pressure to the mold part that is held closed, and over the center of the mold cavity so as to maintain said location in line with the center of pressure of fluid applied within the mold cavity, and characterized by the mold to which the pressure is applied by said motor being a blow mold, a fixed frame extending over the blow mold, a guide supported by the frame and extending radially from the axis about which the indexing head turns, the motor being supported by the guide and movable along the guide in a direction parallel to the direction in which the core rod extends into the cavity of the mold, and means for securing the motor in a position along the guide correlated with the center of pressure of the fluid in the cavity of the blow mold.

2. The injection blow molding apparatus described in claim 1 characterized by the motor including a fluid-operated cylinder-and-piston motor located between the fixed frame and a movable element of the blow mold, the motor piston being operably connected with the movable element of the blow mold, the cylinder-and-piston motor being movable along the fixed frame into a position to locate the piston in approximate alignment with the center of pressure of the blow mold cavity, and means for holding the motor in such a position during operation of the blow molding apparatus.

3. In an injection blow molding apparatus including an indexing head from which core rods extend into molds at angularly related stations around an axis about which the indexing head turns to move the core rods successively from one operational station to another, characterized by one of the stations including a mold support, a mold in said support with upper and lower parts that have relative movement toward and from one another in a direction parallel to said axis to open and close a cavity within the mold, the mold being replaceable with another similar mold that encloses a cavity of a different size from that of the first mold, means for supporting the molds with the center of said similar mold cavity at a different distance from said axis of the indexing head, a motor supported means for applying pressure to either of the mold parts to hold one mold part closed against the other mold part, an upper frame above the mold parts and by which the motor is supported and with respect to which the motor is moveable in directions for changing the position of the motor toward and from the axis of rotation of the indexing head to a location at which said motor applies pressure to the mold part that is held closed, and over the center of the mold cavity so as to maintain said location in line with the center of pressure of fluid applied within the mold cavity, and characterized by the apparatus including a lower and an upper frame, a mold having a cavity into which a core rod extends, a surface of the lower frame on which the mold is supported for movement toward and from an axis about which the indexing head turns, the upper frame having a guide into which a part of the motor extends, said lower and upper frames being movable radially with respect to the axis of the indexing head to shift the mold and the motor simultaneously with respect to said axis to move the mold with respect to the indexing head without shifting the motor with respect to the center of pressure of the cavity in the mold.

4. In an injection blow molding apparatus including an indexing head from which core rods extend into molds at angularly related stations around an axis about which the indexing head turns to move the core rods successively from one operational station to another, characterized by one of the stations including a mold support, a mold in said support with upper and lower parts that have relative movement toward and from one another in a direction parallel to said axis to open and close a cavity within the mold, the mold being replaceable with another similar mold that enclosed a cavity of a different size from that of the first mold, means for supporting the molds with the center of said similar mold cavity at a different distance from said axis of the indexing head, a motor supported means for applying pressure to either of the mold parts to hold one mold part closed against the other mold part, an upper frame above the mold parts and by which the motor is supported and with respect to which the motor is movable in directions for changing the position of the motor toward and from the axis of rotation of the indexing head to a location at which said motor applies pressure to the mold part that is held closed, and over the center of the mold cavity so as to maintain said location in line with the center of pressure of fluid applied within the mold cavity, and characterized by the motor operating motion transmitting means for applying pressure to one of the mold parts to hold the mold closed, said motion transmitting means including a toggle operated by the motor and in position to hold the mold closed when the links of the toggle are in substantial alignment from one another, the motor being a cylinder-and-piston motor located on an axis extending substantially at right angles to the toggle links when said links are in substantial alignment with one another, the motor cylinder having a cylinder with a head end and the head end of the cylinder and a fixed pivot of the toggle being connected to supporting structure that is adjustable to shift the toggle into different positions to apply pressure to the mold at a location substantially in line with the center of pressure of fluid supplied to the mold cavity.

5. The injection blow molding apparatus described in claim 4 characterized by a common support to which both the head end of the motor and a fixed pivot of the toggle are connected, the common support being adjustable toward and from the axis of the indexing head, and means for holding said common support in an adjusted position with the toggle located to apply pressure to the mold at a location substantially in line with the center of pressure of fluid supplied to the mold cavity.

6. The injection blow molding apparatus described in claim 4 characterized by a connecting rod by which a piston of the motor is connected with a center pivot of the toggle, said connecting rod having means for adjusting the length of the rod.

7. In an injection blow molding apparatus including an indexing head from which core rods extend into molds at angularly related stations around an axis about which the indexing head turns to move the core rods successively from one operational station to another, characterized by one of the stations including a mold support, a mold in said support with upper and lower parts that have relative movement toward and from one another in a direction parallel to said axis to open and close a cavity within the mold, the mold being replaceable with another similar mold that encloses a cavity of a different size from that of the first mold, means for supporting the molds with the center of said similar mold cavity at a different distance from said axis of the indexing head, a motor supported means for applying pressure to either of the mold parts to hold one mold part closed against the other mold part, an upper frame above the mold parts and by which the motor is supported and with respect to which the motor is movable in directions for changing the position of the motor toward and from the axis of rotation of the indexing head to a location at which said motor applies pressure to the mold part that is held closed, and over the center of the mold cavity so as to maintain said location in line with the center of pressure of fluid applied within the mold cavity, and characterized by the mold to which the pressure is applied by said motor being a blow mold, a fixed frame extending over the blow mold, a guide supported by the frame and extending radially from the axis about which the indexing head turns, motor-operated means supported by the guide and being movable along the guide in a direction parallel to the direction in which the core rod extends into a cavity of the blow mold, and means for securing the motor-operated means in a position along the guide correlated with the center of pressure of the cavity into which the core rod extends in the blow mold, the motor-operated means including a fluid-operated cylinder-and-piston motor located between a fixed frame of the blow molding apparatus and a movable element of the blow mold, the motor piston being operably connected with the movable element of the mold, the cylinder-and-piston motor being movable along the fixed frame into a position that locates the piston approximately in line with the center of pressure of the blow mold cavity, means for holding the motor in such a position during operation of the blow molding apparatus including a portion of the fixed frame having a surface of the frame on which the mold is supported for movement toward and from the axis about which the indexing head turns, said frame being movable radially with respect to the axis of the indexing head to shift the mold and motor-operated means simultaneously with respect to said axis to move the mold with respect to the indexing head without moving the motor-operated means with respect to the center of pressure of a cavity of the mold.

* * * * *